United States Patent [19]
Ohba

[11] Patent Number: 6,003,471
[45] Date of Patent: Dec. 21, 1999

[54] APPARATUS FOR INHIBITIVELY PREVENTING BIRDS FROM GATHERING

[75] Inventor: Tadao Ohba, Tokyo, Japan

[73] Assignee: Ohba Building Maintenance Co., Ltd., Tokyo, Japan

[21] Appl. No.: 09/221,677

[22] Filed: Dec. 28, 1998

[51] Int. Cl.$^6$ .............................. A01K 29/00; E04B 1/72; A01M 29/00
[52] U.S. Cl. ................................ 119/713; 52/101; 43/124
[58] Field of Search ............................ 119/713; 52/101; 49/58, 59, 60

[56] References Cited

U.S. PATENT DOCUMENTS

| | | | |
|---|---|---|---|
| 3,292,319 | 12/1966 | McCarthy | 52/101 |
| 5,353,543 | 10/1994 | Teraoka | 52/101 |
| 5,497,585 | 3/1996 | Engler | 52/101 |
| 5,649,394 | 7/1997 | Ohba | 52/101 |

*Primary Examiner*—Peter M. Poon
*Assistant Examiner*—Elizabeth Shaw
*Attorney, Agent, or Firm*—Andrus, Sceales, Starke & Sawall

[57] ABSTRACT

An apparatus for inhibitively preventing birds from gathering comprises at least three support columns, wire members tightly spanned between adjacent said support columns, and a plurality of magnet members disposed onto said wire members respectively. An improved apparatus according to the present invention includes an oscillation transmission mechanism to transmit oscillating motion from one to another adjacent wire members. In this apparatus, when a single wire oscillates, one and another of adjacent wire members oscillate by means of the oscillation transmission mechanism.

8 Claims, 7 Drawing Sheets

Fig. 7

APPARATUS FOR INHIBITIVELY PREVENTING BIRDS FROM GATHERING

BACKGROUND OF THE INVENTION

The present invention relates to an apparatus for inhibitively preventing birds from gathering, more particularly, to an apparatus for preventing pigeons, crows or the like from approaching and perching on buildings or the like, using magnets effectively.

An apparatus for inhibitively preventing birds from approaching, which keeps a veranda of an apartment house or the like from contamination of their droppings, generally includes magnetic members which affect on birds' biological magnetism in order to disperse birds. A typical example of such apparatuses is disclosed in Japanese Utility Model Registration No. 2537785. According to the apparatus described in the above-mentioned Utility Model Registration, the apparatus for dispersing birds comprises a plurality of support columns disposed standing upright in an appropriately spaced relationship, a wire member spanned between adjacent support columns, and a plurality of magnetic members fixed onto said wire member respectively. For example, support columns are mounted in aligned relationship onto the upper end surface of an outer wall of a veranda, resulting in many magnetic members being disposed along the upper end surface of an outer wall of a veranda. Pigeons or the like, which dislike magnetic power of magnetic members disposed along an outer wall of a veranda, hesitate to perch on a veranda, and as a result they finally do not approach there.

Also, Japanese Utility Model Registration No. 3029485 discloses a revised apparatus for dispersing birds. In this apparatus, a spring member or spring members are connected to a wire or a wire body so that the wire member deflects a large distance and oscillates vertically when a bird perches thereon. With the structure of this apparatus, birds such as pigeons which perch on a wire member are frightened and fly away. On the other hand, as surrounding magnetic field rapidly changes by the effect of magnetic members which shake accordingly as a wire member oscillate, such birds as not relatively sensitive to magnetism hesitate to approach a veranda or the like. A wire member including one or more spring members provides another effectiveness. For example, in an apparatus installed on a roof-top of a building, when a workman or the like steps on a wire member, the wire member reaches the roof-top without slacking or breaking due to resilience of spring members. And the wire member returns to tightly spanned configuration between two support columns after having been stepped on. Such configuration of this apparatus can prevent said apparatus from breaking easily and shortly.

Meanwhile, it is required to shorten the distance between two adjacent support columns and shorten the length of each wire member so that a wire member does not hang downwardly by gravity thereof and of magnet members connected thereto, and so that a wire member can oscillate in high frequency or at a high speed for a rapid change of magnetic field. However, a wire member formed short in length causes the following inconvenience. When a bird perches on a single wire member and flies thereaway, and then movement upward and downward thereof generates change of surrounding magnetic field. However, magnetic members mounted on a single short wire generate magnetism only in a short distance horizontally, and the area where change of magnetic field generated by the movement of the magnetic members is very narrow and limited. Therefore, the area where other pigeons or the like could be dispersed is also narrowed and limited accordingly.

BRIEF SUMMARY OF THE INVENTION

The present invention has been made in view of the foregoing technical disadvantage of the prior art to provide a novel apparatus for inhibitively preventing birds from gathering.

Therefore, it is the object of the present invention to provide an apparatus for inhibitively preventing birds from gathering which generates change of magnetic field in wide or long area, in spite of including a plurality of short wire members.

It is another object of the present invention to provide an apparatus of very simple structure for inhibitively preventing birds from gathering, which generates change of magnetic field in wide or long area, using short wire members.

In accordance with the present invention, an apparatus for inhibitively preventing birds from gathering includes at least three support columns disposed in an appropriately short-spaced relationship, a wire member tightly spanned between the adjacent support columns respectively, and magnetic members mounted on the wire members respectively. Wire members are spanned between said support columns so as to deflect a large distance and oscillate vertically, and when a single wire member oscillates, the adjacent wire member or wire members start oscillation. Each wire member is normally, when no bird perches thereon, extending along a generally horizontal axis. When a pigeon or the like perches on a wire member, the wire member oscillates, and oscillation of the wire member is transmitted to another adjacent wire members. Thus, many wire members oscillate generally at the same time, and consequently a great many magnetic members mounted on the wire members move upward and downward. Then the vertical movement of the magnetic members which are arranged in a long line generates change of magnetic field in wide or long area.

In order to have a wire member deflect a large distance and oscillate vertically, it is usually required that spring members are connected to a rigid wire body such as an iron wire. A spring member or spring members may be interposed between a support column and an end of a wire, or two spring members may be interposed between opposite ends of a wire body and support columns. Otherwise, a wire body is cut into two short wire sections, and a spring member is connected with each short wire section. That is, a spring member is interposed between two short wire sections.

In order to transmit oscillation from one to another of wire members, it is required that a support column comprises a column body and an oscillation transmission member mounted thereon, an end of a wire member is connected to an end of the oscillation transmission member. Generally, only support columns disposed in-between, or support columns disposed intermediate between the first and the last support columns disposed on opposite end positions comprise support column bodies and oscillation transmission members. Other support columns, the first and the last support columns disposed on opposite end positions do not include oscillation transmission members, and each wire member located at opposite end positions is directly connected to the first and the last support columns at one end of the wire member. When a single wire member oscillates, the oscillation transmission member vibrates. And then with vibration of the oscillation transmission member, one and another of adjacent wire members starts oscillation.

In a preferred embodiment of the present invention, an oscillation transmission member is formed into a bar shape or a plate shape, provided at each longitudinal end thereof with connecting portion for connection with an end of a wire member. The oscillation transmission member is mounted to said column body so as to rock and oscillate vertically on an axis of the longitudinal center or on an axis of the center between both connecting portions. In other words, in order to allow longitudinal opposite ends of the oscillation transmission member to repeatedly move upward and downward alternately, said oscillation transmission member is mounted to the column body. More specifically, an oscillation transmission member may be formed into a plate shape, provided in the center thereof with a through-hole with clearance, and fit over a column body by passing the column body through the through-hole thereof. The through-hole should have sufficient size and suitable shape so that an oscillation transmission member can rock in seesaw motion and oscillate vertically. Therefore, an oscillation transmission member can travel vertically along a column body. However, in order to hold a wire member at the fixed height in a substantially horizontal relationship, it is required that an oscillation transmission member cannot travel lower than the fixed height. In order to meet such requirement, a stopper portion (or a catch portion) is provided onto a support column to hold an oscillation transmission member at a certain height. Typically, an abutment portion is defined (preferably, a cap fitted over on a column body or a nut screwed on the upper end portion of a column body) in order to prevent coming-off of an oscillation transmission member. An oscillation transmission member is so mounted on a column body as to vertically move between a stopper portion and an abutment portion. Thus, the distance between the stopper and the abutment portions should be long sufficient to ensure satisfactory vibrating or rocking motion of the oscillation transmission member, that is, not to decline extremely motion of the oscillation transmission member. In order to transmit oscillation from one to another of wire members smoothly, it is required that an oscillation transmission member oscillate vertically and largely only along a virtual vertical surface including longitudinal both ends thereof. Therefore, a through-hole should be formed extending longitudinally of the oscillation transmission member, or between both connecting portions of the oscillation transmission member, with width somewhat longer than the diameter of a column body.

For example, a stopper portion is a nut, which is screwed on the lower end of an external thread portion defined onto a column body with an appropriate length from upper end thereof. Such a stopper portion is very simple. Outer dimension of such a nut is formed larger than width of a through-hole of an oscillation transmission member. In order to keep oscillating motion of an oscillation transmission member constantly, or in order not to decline motion of an oscillation transmission member, it is required to minimize frictional resistance between an oscillation transmission member and a column body. Therefore, it is desired that a cover member or a covering member formed into a short pipe shape or a tubular shape fits over the external thread portion of a column body to prevent the oscillation transmission member from being caught in uneven surface of the external thread portion during oscillation thereof. Such configuration of an apparatus also prevents metallic friction noise during oscillation. A cover member may be made of vinyl pipe or thin plastic pipe.

An oscillation transmission member may also comprise a support member formed into a casing shape having openings at least at longitudinal both ends thereof and fixed onto the upper end of a column body, and a plate-shaped oscillation member or an oscillation plate positioned inside the support member. Wire members are connected to the connecting portions, which are provided at both ends of said oscillation plate. The oscillation plate is supported by the support member on the longitudinal center thereof so as to rock upward and downward and to oscillate vertically. Typically, both longitudinal distal ends of the oscillation plate extend outward from open ends of the support member. More specifically, a support member is fixed with the bottom surface thereof onto the top end of the column body. A plate-shaped oscillation member is rotatably supported by the support member in the longitudinal center of front end and rear end surfaces thereof.

BRIEF DESCRIPTION OF THE DRAWING

FIG. 2 is a perspective view showing the structure of upper part of a support column disposed in-between.

FIG. 3 is an exploded perspective view showing the structure of the upper part of a support column disposed in-between.

FIG. 7 is a perspective view showing another structure of the upper part of a support column disposed in between.

DETAILED DESCRIPTION OF THE PREFERRED EMBODIMENTS

Now, the present invention will be described hereinafter with reference to the accompanying drawings.

Figure 1:
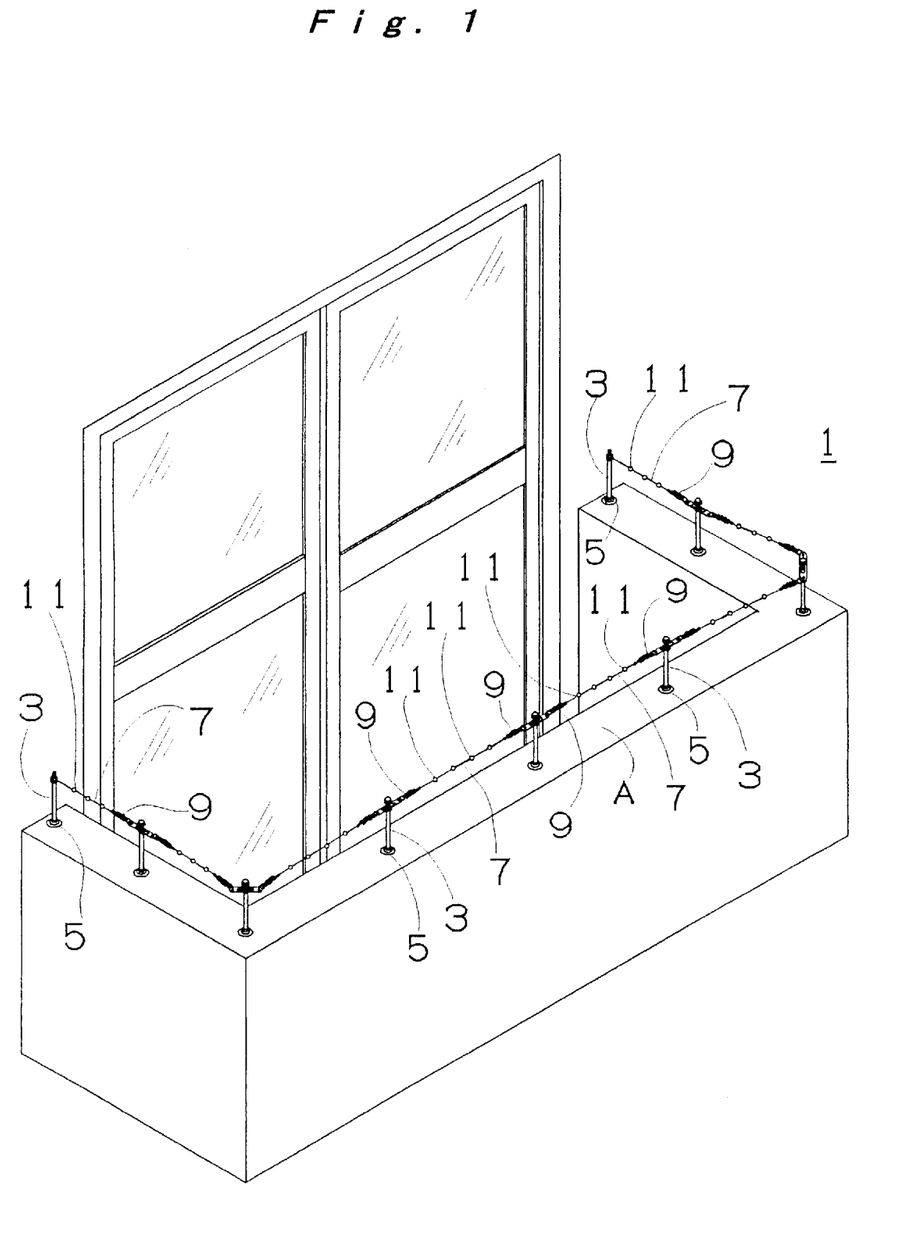
FIG. 1 is a perspective view showing an apparatus for inhibitively preventing birds from gathering, disposed along the upper end surface of an outer wall of a veranda according to the present invention.

Referring FIG. 1, an apparatus for inhibitively preventing birds from gathering 1 in accordance with the present invention includes a plurality of support columns 3, which are securely disposed along the entire length of the upper end surface A of an outer wall of a veranda in an appropriately short-spaced relationship. A support column 3 is provided at the lower end thereof with a fitting disk portion 5 where through-holes are provided (not shown in the drawing). And a support column 3 is fixed on the upper end surface A of the outer wall with bolts screwed through the through-holes in the fitting disk portion 5 to the upper end surface A. Each between two support columns 3, 3, a wire 7 is spanned on the upper positions of the support columns 3. A wire 7 is connected at both ends thereof to support columns 3, 3 via tension coil springs 9, 9. One end of each wire 7 located on opposite end positions is directly connected to each of support columns 3, 3 located on opposite end positions. Three or four spherical magnets 11 are mounted on each of a wire 7. A metallic needle 13 is fixed in a magnet 11 so as to extend vertical upwards and so as to be magnetized (Referring to FIG. 2). In the present invention, an apparatus for inhibitively preventing birds from gathering may also comprise a small number of support columns, for example, three support columns. In said apparatus, a plurality of apparatuses for inhibitively preventing birds from gathering are disposed along the entire length of the upper end surface A of an outer wall of a veranda or the like.

Figure 2:
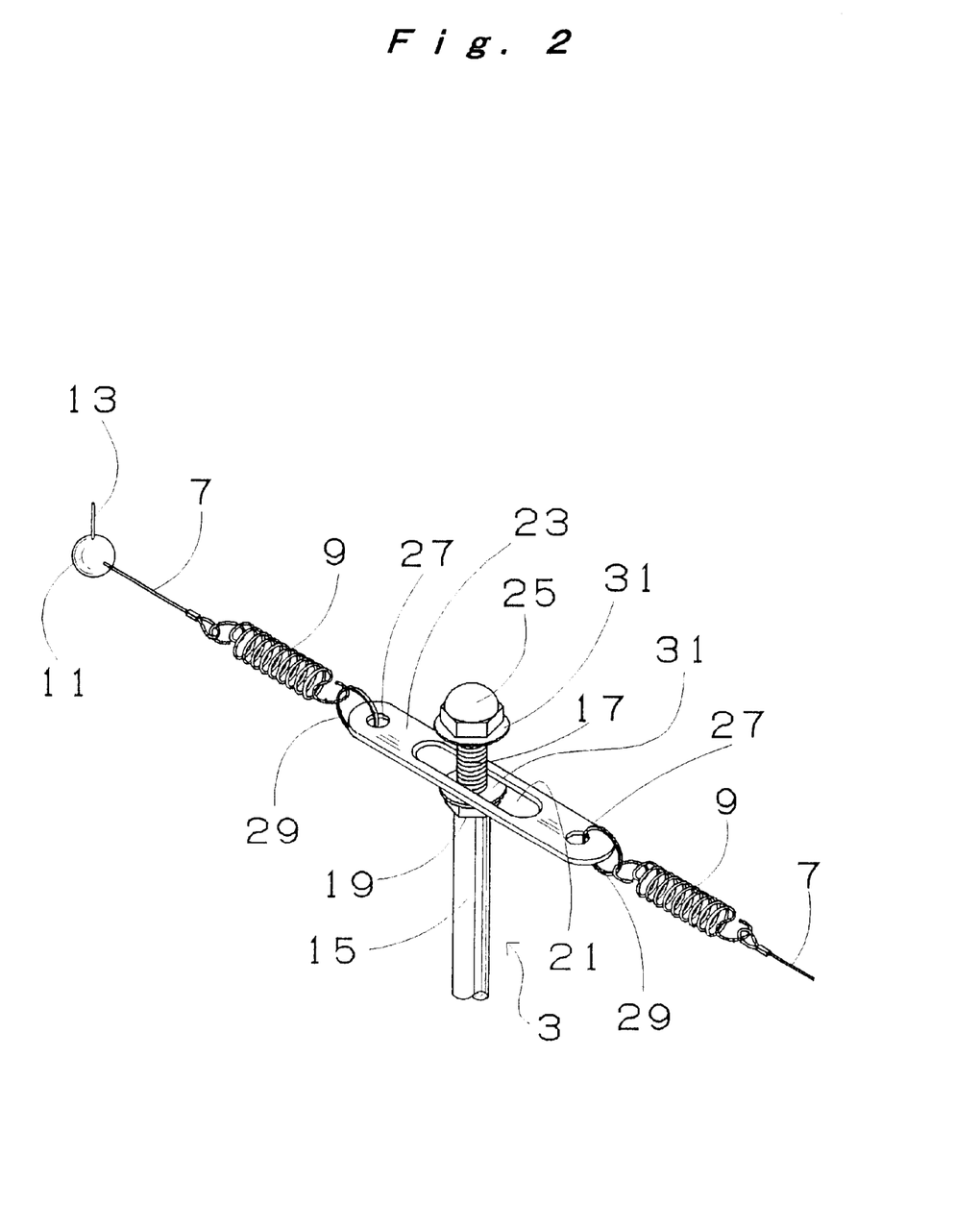
Figure 3:
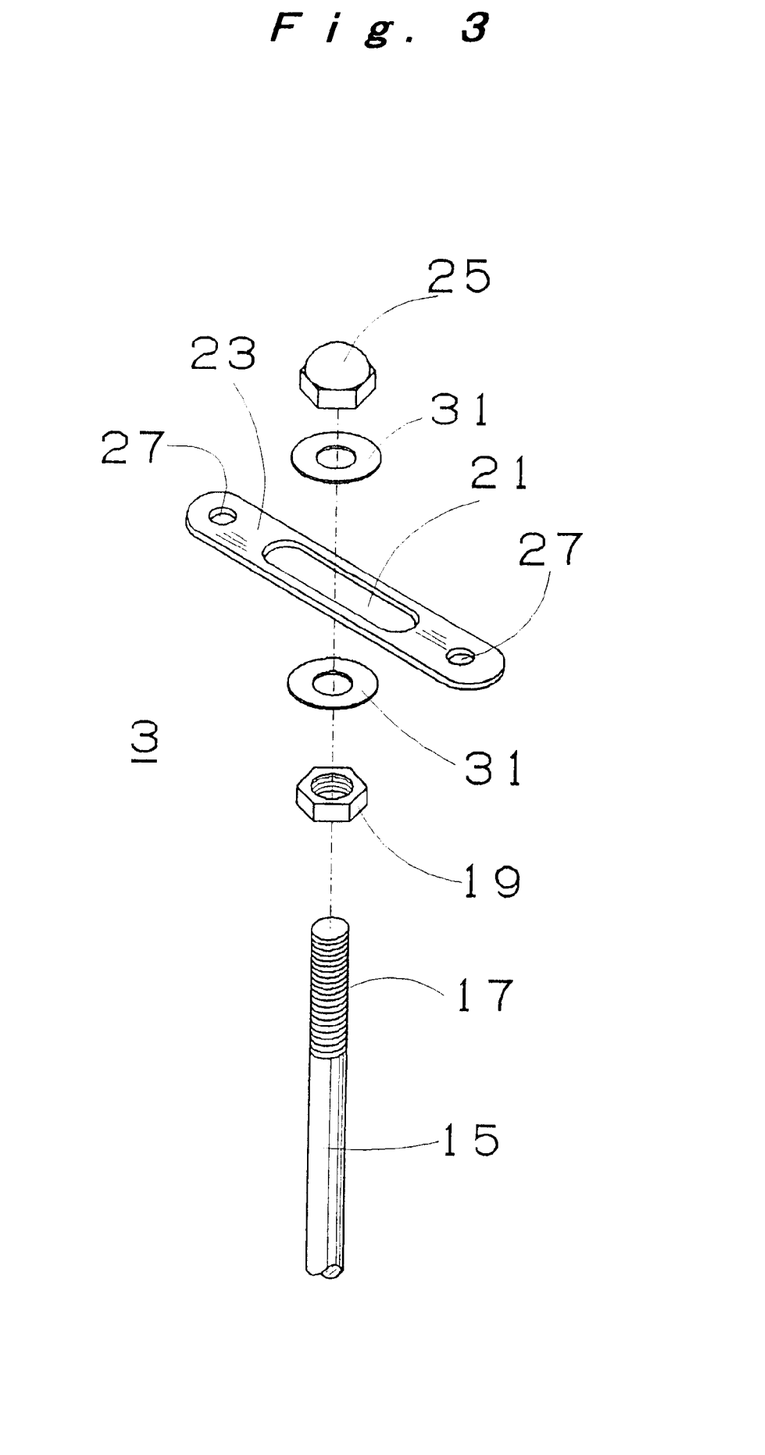
Figure 4:
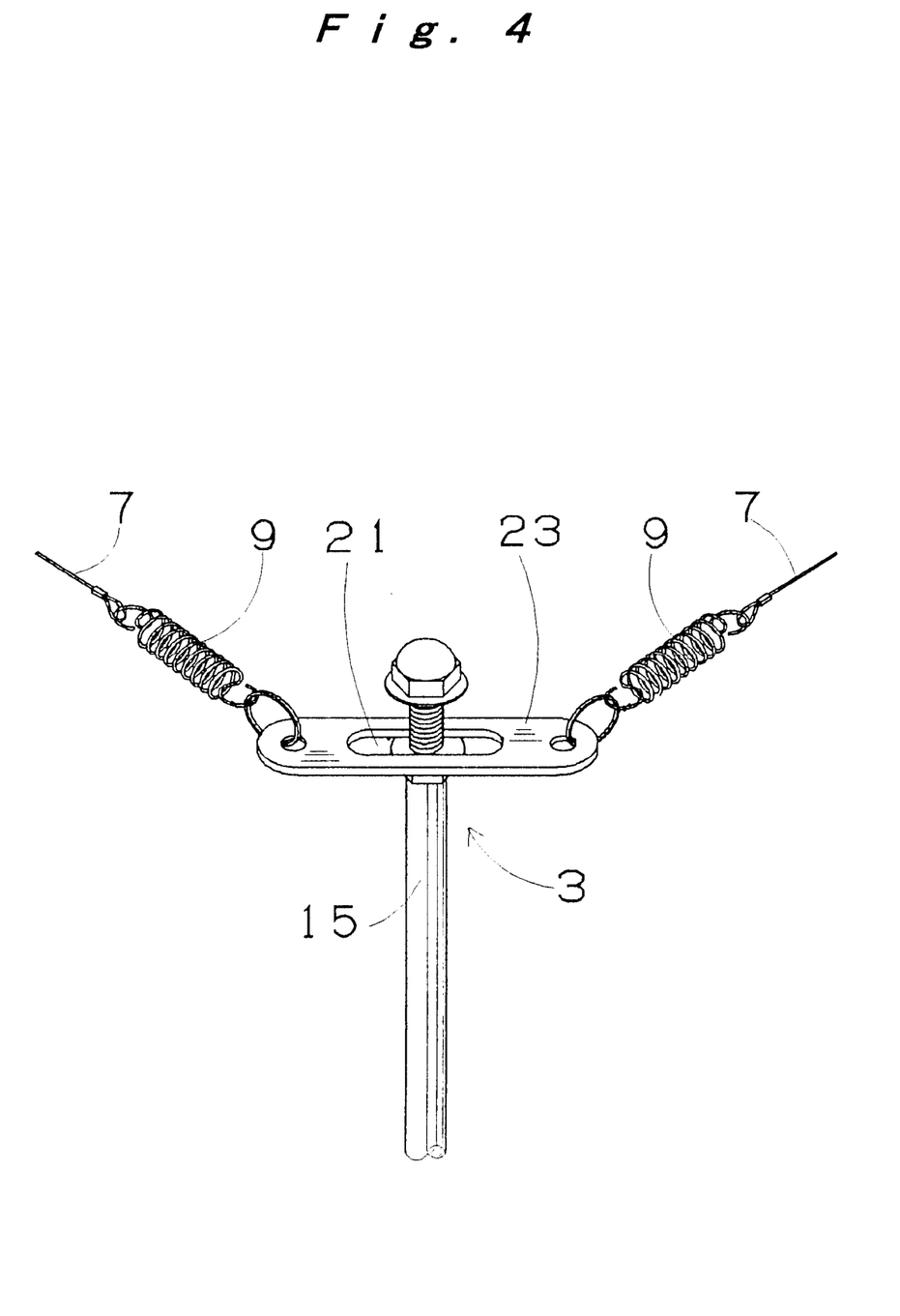
FIG. 4 is a perspective view of a support column disposed in corner.

Referring to FIGS. 2 and 3, a metallic column body 15 of a support column 3 positioned intermediate between the first and last support columns 3, 3, is externally threaded short in length and on the upper part up to the upper end thereof. On the short threaded portion 17, a nut 19 is screwed down to the lower end thereof in fixed relationship. A metallic oscillation transmission plate 23 as an oscillation transmission member, which is formed into a flat bar shape, and is provided in the center thereof with a through-hole 21, fits over the column body 15 above a nut 19, by passing the external thread portion 17 through the said through-hole 21. A cap 25 is screwed on the upper end of the external thread portion 17 of a column body 15 to define an abutment portion. Connecting holes 27, 27 as connecting portion are provided at both ends lengthwise of an oscillation transmission plate 23, and a connecting ring 29 is attached to each said connecting hole 27. Hook portions are formed on opposite ends of a tension coil spring 9, one hook portion of the tension coil spring 9 is engaged to a connecting ring 29, and the other hook portion thereof is attached to one end of a wire 7. That means, a pair of wire 7,7 are connected to an oscillation transmission plate 23, and an oscillation transmission plate 23 is interposed via tension coil springs 9, 9 between a pair of wire 7, 7. In FIGS. 2 and 3, reference numeral 31 designates a plastic protect disk, which prevents direct collision or friction between an oscillation transmission plate 23 and a nut 19, or a cap 25, during vibration or oscillation of an oscillation transmission plate 23. The protect disk 31 is typically fitted over the external thread portion 17 with clearance or play. As illustrated in FIG. 4, an oscillation transmission plate 23 of a support column 3 positioned on the corner of the upper end surface A of an outer wall is pulled by wires 7, 7 at both ends thereof to be located at 45° to the direction of wires 7, 7 extending. An oscillation transmission plate 23 of a support column 3 on the corner may be formed at both ends thereof bent or curved at an appropriate angle to the direction of wires 7, 7 extending.

Figure 6:
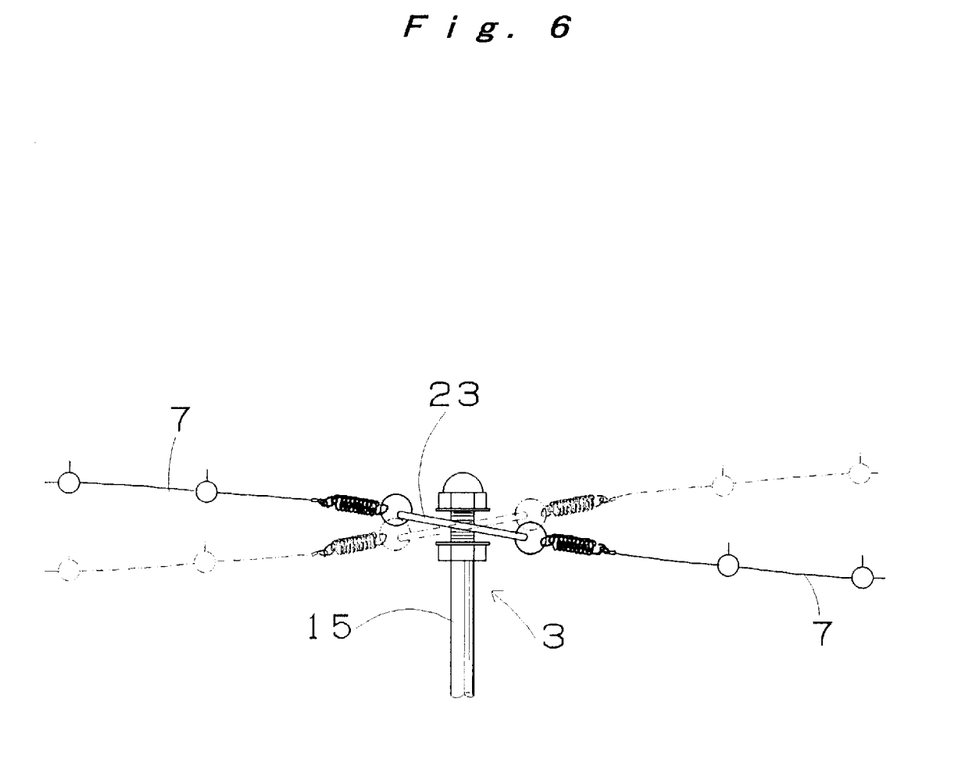
FIG. 6 is a conceptional view showing the condition where oscillation is transmitted among wire members.

A through-hole 21 of an oscillation transmission plate 23 is formed extending longitudinally of the oscillation transmission plate 23, with width somewhat longer than the diameter of the external thread portion 17 of a column body 15. This allows an oscillation transmission plate 23 to oscillate vertically along a virtual surface including longitudinal both ends of the oscillation transmission plate 23, on an axis of the longitudinal center of the oscillation transmission plate 23 or of a column body 15 (more specifically, external thread portion 17). Thus, as shown in FIG. 6, a single wire 7 oscillates vertically, with resultant rocking and oscillation of an oscillation transmission plate 23 connected thereto. Then oscillating motion is transmitted from one to the other of adjacent wires 7, 7, resulting that another wire 7 starts oscillation. Consequently, oscillating motion is transmitted from one to another of wires 7. It is required that a through-hole 21 of an oscillation transmission plate 23 has a sufficient length not to disturb oscillation of an oscillation transmission plate 23, and it is also required that the distance between a nut 19 and a cap 25 is defined to allow an oscillation transmission plate 23 to tilt at a sufficiently wide angle to horizontal direction, and to travel long distance sufficient to vertical direction. In other words, it is required that the distance between a nut 19 and a cap 25 (when a protect disk 31 is provided, the distance between the protect disks 31, 31) is sufficiently longer than thickness of an oscillation transmission plate 23, and is preferably at least three times of the thickness thereof. In this embodiment, a vibration or oscillation transmission plate 23 is about 3.5 mm in thickness, the distance between a nut 19 and a cap 25 is arranged about 13.5 mm, and a protect disk 31 each is about 1.0 mm in thickness. It is considered that an oscillation transmission plate should move largely upward and downward along an external thread portion 17 of a column body 15, just after a wire 7 connected thereto starts oscillation. When the distance between a nut 19 and a cap 25, or the space allowing an oscillation transmission plate 23 to move upward and downward, is not long enough, kinetic energy of an oscillation transmission plate 23 is extremely damping. With the resultant, when a bird perches on a wire and flies thereaway, oscillation of a wire 7 declines soon.

Figure 5:
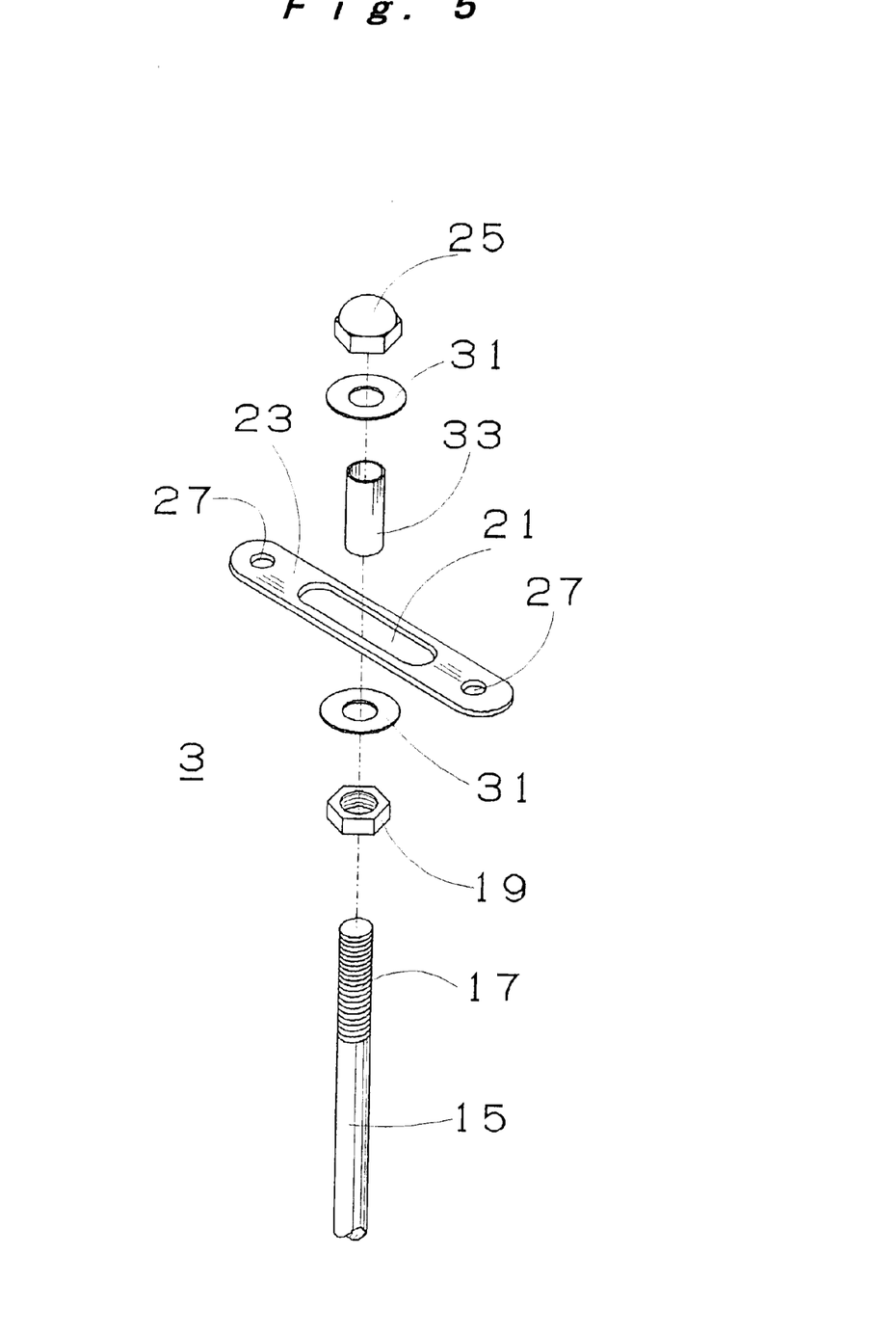
FIG. 5 is an exploded perspective view showing the structure of the upper part of a support column where a vinyl pipe is applied.

In order to oscillate an oscillation transmission plate 23 upward and downward largely when a wire 7 oscillates, it is required that frictional resistance between an oscillation transmission plate 23 and a column body 15 is minimized as low as possible. However, as an oscillation transmission plate 23 fits over the external thread portion 17 of a column body 15, an oscillation transmission plate 23 might be caught in uneven surface of the external thread portion 17, and oscillating motion of the oscillation transmission plate 23 might be disturbed. Therefore, as shown in FIG. 5, a vinyl pipe 33 as a covering member may fit tightly over an external thread portion 17. In this case, the width of a through-hole 21 in an oscillation transmission plate 23 is formed somewhat larger than the diameter of a vinyl pipe 33.

In apparatus for inhibitively preventing birds from gathering 1 constructed as aforementioned, when a single wire 7 oscillates vertically, for example, by a bird such as a pigeon which perches thereon and immediately flies thereaway, the adjacent wire 7 oscillates vertically as well via motion of an oscillation transmission plate 23 as shown in FIG. 6. It is also possible to transmit oscillation of a single wire 7 to all or most of other wires 7, by connecting all or most of wires 7 each other by means of oscillation transmission plates 23.

Figure 7:
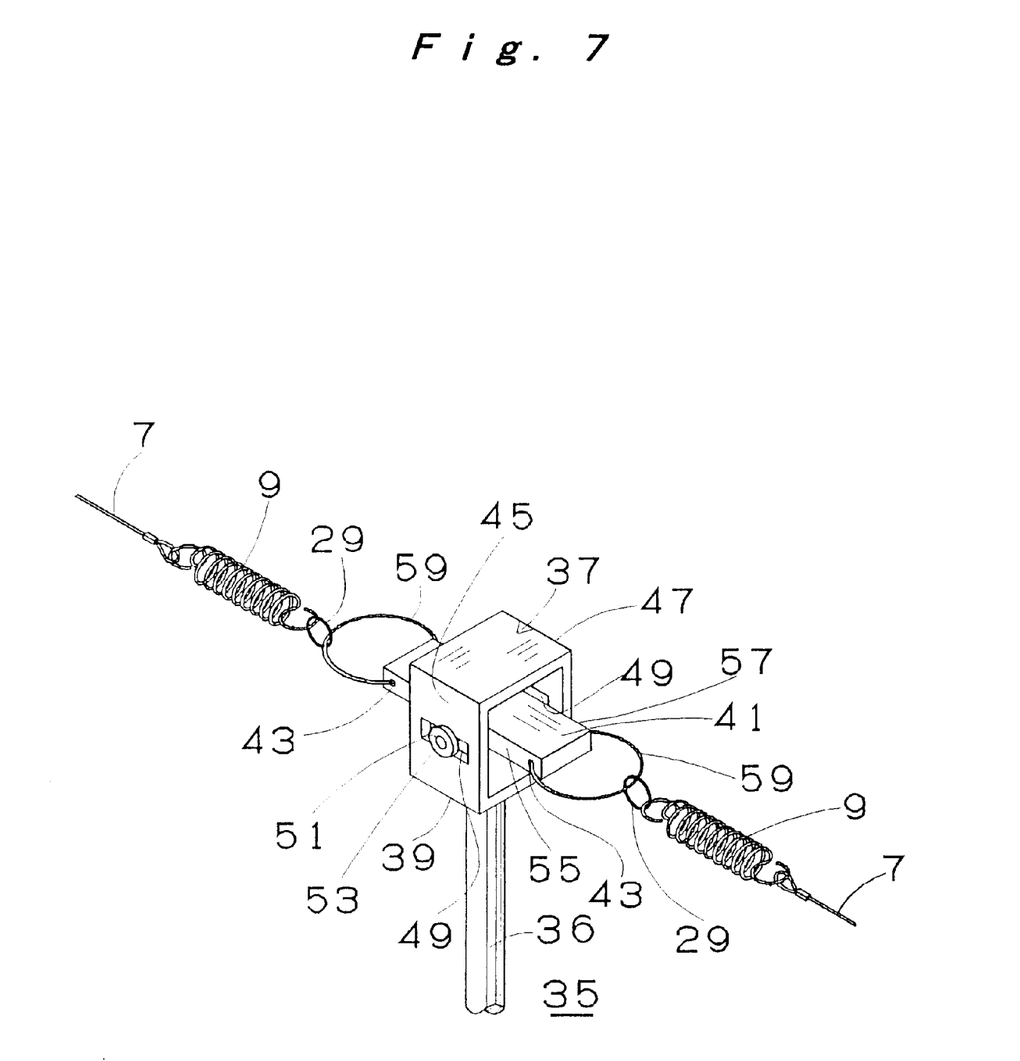

Referring to FIG. 7, another structure of a support column disposed in-between is illustrated. In this structure, an open ended casing support member 37 is fixed with bottom surface thereof onto the upper end of a metallic column body 36 of a support column 35. A plate-shaped oscillation member 41 is disposed inside a casing support member 37, with each longitudinal distal end thereof extending outward from open ends of the casing support member 37. The plate-shaped oscillation member 41 is provided at longitudinal opposite ends thereof with connecting through-holes 43, 43 as connecting portion. In the vertical center of a front surface portion or a front wall 45 and a rear surface portion or a rear wall 47 of a casing support member 37, support holes 49 formed somewhat extending longitudinally are provided. Support pins 53, 53 with abutment portions 51 of a larger diameter on outermost portion thereof, are passed rotatably through the support holes 49, 49, and are fixed onto the longitudinal center of a front end surface 55 and a rear end surface 57 of a plate-shaped oscillation member 41. Thus a plate-shaped oscillation member 41 can accordingly rock on an axis of the longitudinal center thereof. Therefore, when one of wires 7, 7, oscillates, which are connected to a ring 59 each secured in connecting through-holes 43, 43 via connecting ring 29 (formed somewhat smaller in diameter) and an resilient tension coil spring 9, a plate-shaped oscillation member 41 rocks on the axis of the longitudinal center thereof, and transmits motion from one to another of adjacent wires 7. It is required that openings of the opposite ends of a casing support member 37 are arranged to have a sufficient height to allow the plate-shaped oscillation member 41 to tilt at a sufficiently wide angle to a horizontal axis, or a sufficient height exceeding the thickness of the plate-shaped oscillation member 41. As an open-ended casing support member 37, which is closed at top keeps driving portions therein almost free from dust or the like, an effectiveness of stable transmission of oscillation is usually expected.

I claim:

1. An apparatus for inhibitively preventing birds from gathering, comprising:

at least three support columns disposed standing upright in an appropriate spaced relationship; wire members tightly spanned between the adjacent support columns extending along a generally horizontal axis so as to deflect a large distance and to oscillate vertically; magnetic members mounted on each of the wire members;

an oscillation transmission member mounted to the support columns for oscillating the wire members; and wherein oscillation of one of the wire members is transmitted to adjacent another of the wire members.

2. An apparatus for inhibitively preventing birds from gathering, comprising:

at least three support columns disposed standing upright in an appropriate spaced relationship; wire members tightly spanned between the adjacent support columns extending along a generally horizontal axis, so as to deflect a large distance and to oscillate vertically; magnetic members mounted on each of the wire members;

wherein oscillation of one of the wire members is transmitted to adjacent another of the wire members;

wherein the support column disposed in-between includes a column body and an oscillation transmission member mounted thereto;

wherein each of the wire members includes a wire and one or more spring members connected thereto, the wire member is connected to the oscillation transmission member at one end thereof; and wherein oscillation of one of the wire members is transmitted to adjacent another of the wire members via the oscillation transmission member.

3. An apparatus for inhibitively preventing birds from gathering, comprising:

at least three support columns disposed standing upright in an appropriate spaced relationship; wire members tightly spanned between the adjacent support columns extending along a generally horizontal axis, so as to deflect a large distance and to oscillate vertically; magnetic members mounted on each of the wire members;

wherein oscillation of one of the wire members is transmitted to adjacent another of the wire members;

wherein the support column disposed in-between includes a column body and an oscillation transmission member mounted thereto;

wherein each of the wire members includes a wire and one or more spring members connected thereto, the wire member is connected to the oscillation transmission member at one end thereof:

wherein oscillation of one of the wire members is transmitted to adjacent another of the wire members via the oscillation transmission member;

wherein the oscillation transmission member is formed into a bar shape or a plate shape provided at both ends thereof with connecting portions, the oscillation transmission member is mounted to the column body so as to rock upward and downward and to oscillate vertically on an axis of the longitudinal center thereof; and wherein the wire member is connected to the connecting portion of the oscillation transmission member.

4. An apparatus for inhibitively preventing birds from gathering, comprising:

at least three support columns disposed standing upright in an appropriate short-spaced relationship; wire members tightly spanned between the adjacent support columns extending along a generally horizontal axis; magnetic members mounted on each of the wire members;

wherein the support column disposed in-between includes a column body and an oscillation transmission member mounted thereto, the oscillation transmission member is formed into a plate shape, being provided at both ends thereof with connecting portions and at center thereof with a through-hole, the oscillation transmission member fits over the column body by passing the column body through the through-hole with clearance;

wherein each of the wire members includes a wire and one or more spring members connected thereto, resulting that the wire members deflect a large distance and oscillate vertically, the wire member is connected at one end thereof with the connecting portion of the oscillation transmission member;

wherein the column body is provided with a stopper portion to support the oscillation transmission member at fixed height; and, wherein the through-hole is formed in a sufficient size or shape, so as to allow the oscillation transmission member to rock upward and downward and to oscillate vertically on an axis of longitudinal center thereof.

5. The apparatus as set forth in claim 4, wherein the through-hole is formed extending longitudinally of the oscillation transmission member.

6. The apparatus as set forth in claim 4, wherein the column body is provided along an appropriate length from upper end thereof with an external thread portion; and, wherein the stopper portion is defined by a nut screwed down to lower end of the external thread portion.

7. The apparatus as set forth in claim 6, including:

a short tubular covering member fitted over the external thread portion in order to prevent the oscillation transmission member which is oscillation from being caught in uneven surface thereof.

8. An apparatus for inhibitively preventing birds from gathering, comprising:

at least three support columns disposed standing upright in an appropriate short-spaced relationship; wire members tightly spanned between the adjacent support columns extending along a generally horizontal axis; magnetic members are mounted on each of the wire members;

wherein the support column disposed in-between including a column body and an oscillation transmission member mounted thereto, the oscillation transmission member includes a supporting member fixed on upper end of the column body and a plate-shaped oscillation member being supported by the supporting member in longitudinal center thereof in order to oscillate vertically, the plate-shaped oscillation member provided at both ends thereof with connecting portions; and, wherein each of the wire members includes a wire and one or more spring members connected thereto, the wire member is connected to the connecting portion of the plate-shaped oscillation member.

* * * * *

UNITED STATES PATENT AND TRADEMARK OFFICE
CERTIFICATE OF CORRECTION

PATENT NO.   : 6,003,471
DATED        : December 21, 1999
INVENTOR(S)  : Tadao Ohba It is certified that error appears in the above-indentified patent and that said Letters Patent is hereby corrected as shown below:

Title page, insert at item

--[30] Foreign Application Priority Data:

Dec. 31, 1997   [JP]   Japan . . . . . . . .369605/1997-

Signed and Sealed this

Twenty-second Day of August, 2000

Attest:

Q. TODD DICKINSON

Attesting Officer          Director of Patents and Trademarks